Sept. 19, 1950 W. L. MARTIN 2,523,223
BEADING STRIP
Filed July 19, 1948
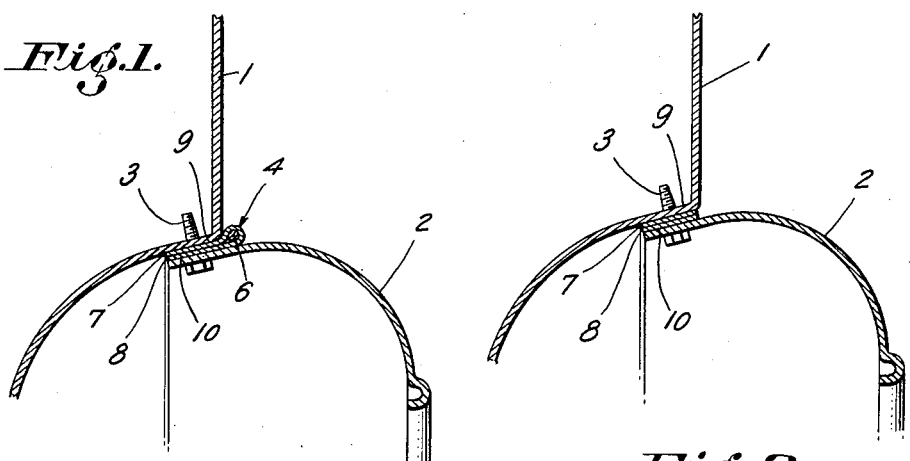
Fig. 1.
Fig. 2.
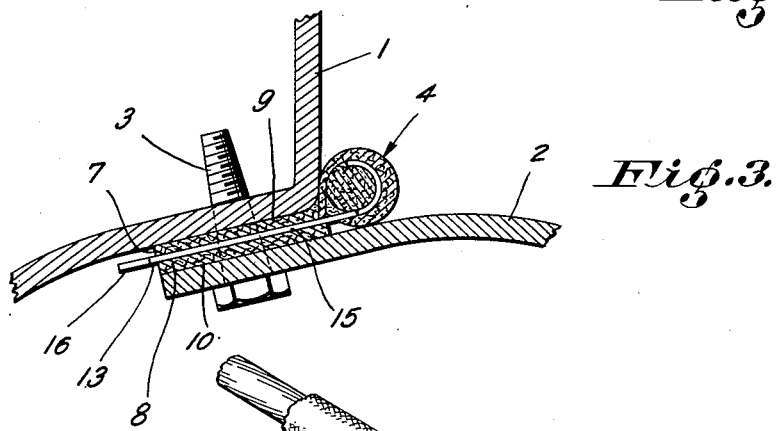
Fig. 3.
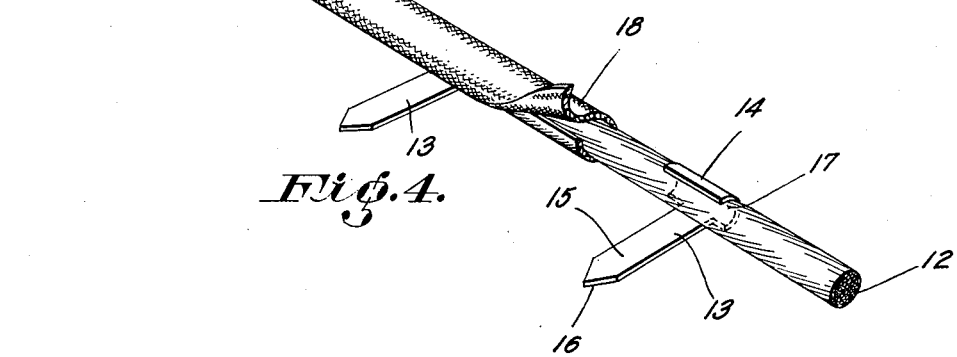
Fig. 4.
Inventor
Winford L. Martin
By J. Calvin Brown
Attorneys Patented Sept. 19, 1950

2,523,223

UNITED STATES PATENT OFFICE 2,523,223

BEADING STRIP

Winford L. Martin, Los Angeles, Calif.

Application July 19, 1948, Serial No. 39,560

2 Claims. (Cl. 280—153.5)

The present invention relates to a fender welt and particularly to a type of welt which is adapted to act as a replacement unit.

At the present time it is customary to provide between aprons, grilles, fenders and a car body a type of welt having the appearance of leather, which acts as an ornament and hides the separation line between the body and the member aforesaid. Ordinary fender welts include a fabric flange which extends laterally from a cylindrical portion, the flange being interposed between a portion of the fender, grille, apron and the body. The exposed cylindrical portion or bead often deteriorates and becomes unsightly, necessitating removal and replacement of the welt. This requires a loosening or unfastening of the members from the body, the removal of the old welt, its replacement with a new welt, followed by tightening the fender, grille or apron to the body. Such a procedure as outlined is expensive and time-consuming.

An object of the present invention is the provision of a welt bead which may be substituted for the old welt bead without the necessity of entirely removing the old welt from the body.

In the practice of the invention the cylindrical portion or bead of the old welt is cut away, leaving the flange portion thereof interposed between the fender or other member and the body. An object of the present invention is to provide a replaceable welt bead construction which is easily and quickly secured to the flanges of the old welt.

A further object is a replaceable welt bead in the form of a strip which is inexpensive in cost of construction, easily manufactured and generally superior to welts now known to the inventor.

With the above-mentioned and other objects in view, the invention consists in the novel and useful provision, formation, construction, association, and relative arrangement of parts, members and features, all as shown in a certain embodiment in the accompanying drawing described generally and more particularly pointed out in the claims.

In the drawing, Figure 1 is a fragmentary sectional view showing a fender secured to a body with a welt interposed between the body and the fender, the welt being of the type which is to be replaced;

Figure 2 is a sectional view similar to Figure 1, the cylindrical portion of the welt being removed;

Figure 3 is an enlarged fragmentary view partly in section showing the fender welt bead of the invention positioned at the juncture between a body and a fender; and Figure 4 is a fragmentary perspective view of the fender welt bead of the invention.

Referring now to the drawing, I have shown at 1, a portion of the body of a vehicle and at 2, a fender which is adapted to be secured to the body as by means of screws 3. Ordinarily, there is positioned at the juncture between the body 1 and fender 2 what is known as a welt 4. This welt hides the line of juncture between the fender and the body and enhances the vehicle appearance. An ordinary welt includes a fabric adapted to simulate leather, or in fact it may be leather, which is passed around either a cord or a wire and provided with an extended flange or flanges. The flange is adapted to be positioned between the abutting portions of the fender and the body. For instance, in Figure 1, the welt material is shown at 5, which material surrounds a central cord or core 6 forming a bead, with portions of the material at 7 and 8 forming flanges which are in abutting relationship and adapted to be positioned between the vehicle body and the fender at 9 and 10. Screws or the like 3 are passed through both the fender and body as well as the flanges 7 and 8. When the screws are tightened, the welt is held securely in position. After a vehicle has been exposed to the elements, the flanges 7 and 8 often adhere to the fender and the body so that removal thereof is difficult without a scraping operation. Furthermore, the cylindrical portion or bead, which meets the eye of the observer, may deteriorate, become broken or otherwise damaged, which necessitates, in order to preserve vehicle appearance, removal of the welt and replacement. Ordinarily, such replacement is afforded by disconnecting or loosening the fender from the body through adjustment or removal of the screws 3. This, however, is an expensive operation and entails considerable time. To overcome this difficulty, I have provided a replaceable welt bead of the type shown in Figures 3 and 4. This replaceable unit includes a core 12 of cord, wire, or other material, and I secure on the cord a series of spaced members 13 each comprising a separate flat rigid tongue 15 extending transversely from the core in a common plane. The tongues 15 are rigid but are adapted to be bent and the inner end 14 of each tongue is clampingly engaged around at least a major portion of the circumference of the core to secure the tongue in position. The tongue has a pointed outer end 16. The engaged portion 14 is preferably of greater length than the width of the tongue. The portion 14 tightly engages the cord or core 12 so as to compress the same at 17. Preferably the tongue is of thin metal, with the result that after the inner end is secured about the core and compresses the same, the core on opposite sides of the engaged portion maintains the same diametric dimension as the tongue end.

All of the tongues 15 extend from one side of the cylindrical portion or bead and lie in the same horizontal plane, as shown in Figure 4. Fabric 18 encases the core and the engaged portions 14, the fabric being glued, stitched, or otherwise held to the core, with the result that the fabric has a smooth appearance, and is substantially the same diameter throughout its length. The engaged portions 14 are not noticeable through the fabric. When it becomes necessary to remove the old welt such as shown at 5 in Figure 1, the operator uses a sharp knife and cuts away the cylindrical portion, which leaves the flange portions 7 and 8 interposed between the body and the fender as shown in Figure 2. Without loosening the screws 3, the tongues 15 are then pressed between the flanges 7 and 8 of the old welt, as shown in Figure 3. Thus, the new welt bead is secured in position of service as shown in Figure 3 within a minimum of time and at slight expense. As the tongues are of light metal and pointed, no difficulty is experienced in pushing the tongues between the flanges 7 and 8 of the old welt. This article as finished comprises a core having spaced circumferentially extending indented portions formed as shown by compressing the portions 14 of the tongues about the core. The indented portions of the core lie within the normal diameter of the core as well as do the tongue end portions 14, resulting in a smooth diameter for the entire core.

I claim:

1. The combination with a body, a removable member of a vehicle and an interposed welt flange from which the bead has been removed, of a replaceable continuous beading strip including a cylindrical portion, a plurality of spaced tongues each having an inner end clampingly engaged with said cylindrical portion, said tongues being of sufficient rigidity and having a sharp outer end so that the outer ends thereof are adapted to be driven between the welt flange, body and removable member to secure the beading strip at the zone of juncture between the body and removable member, and a covering for the beading strip and engaged portions of said tongues.

2. A beading strip of the character described including a compressible core having a plurality of spaced circumferentially extending indented portions lying within the normal diameter of the core, a plurality of separate flat single tongues, the inner ends of said tongues each clampingly engaging around the core at the indented portion and lying within the normal diameter of said core, said tongues extending transversely from the core in a common plane, and a cover for the core and engaged portions of said tongues.

WINFORD L. MARTIN.

REFERENCES CITED

The following references are of record in the file of this patent:

UNITED STATES PATENTS

| Number | Name | Date |
|---|---|---|
| 1,907,044 | Crowe | May 2, 1933 |
| 2,013,598 | Brooke | Sept. 3, 1935 |
| 2,056,880 | Zabel et al. | Oct. 6, 1936 |
| 2,314,481 | Crooks | Mar. 23, 1943 |
| 2,483,622 | Burski | Oct. 4, 1949 |